United States Patent [19]

Kelly

[11] 4,205,657
[45] Jun. 3, 1980

[54] CONVERTIBLE MODULAR TRI-MODE SOLAR CONVERSION SYSTEM

[76] Inventor: Donald A. Kelly, 58-06 69th Pl., Maspeth, N.Y. 11378

[21] Appl. No.: 965,187

[22] Filed: Nov. 30, 1978

[51] Int. Cl.² .......................... F24J 3/02; F28F 7/00; H01L 31/00
[52] U.S. Cl. .................................. 126/425; 60/641; 126/433; 126/438; 136/89 PC; 165/137
[58] Field of Search ................ 165/137; 126/433, 424, 126/425, 438, 442, 445, 432; 136/89 PC

[56] References Cited

U.S. PATENT DOCUMENTS

| | | | |
|---|---|---|---|
| 1,683,266 | 9/1928 | Shipman | 126/424 |
| 3,847,136 | 11/1974 | Salvail | 126/424 |
| 4,103,672 | 8/1978 | Meyer | 126/424 |
| 4,114,594 | 9/1978 | Meyer | 126/424 |
| 4,116,221 | 9/1978 | Zaugg | 126/424 |
| 4,122,827 | 10/1978 | Rhodes | 126/424 |
| 4,129,119 | 12/1978 | Yoke | 126/424 |

*Primary Examiner*—James C. Yeung
*Assistant Examiner*—Daniel J. O'Connor

[57] ABSTRACT

The convertible, modular tri-mode solar conversion system provides two primary heating modes, -both hot water and hot air for winter time operation, with conversion to one secondary mode for electric power generation and air conditioning during summertime operation.

The tri-mode solar conversion system utilizes linear parabolic concentrators for converting solar energy to hot water/steam, hot air, and heat engine/electric power generation for nearly all year round operation with improved overall cost-effectiveness.

Wintertime hot water is provided within a conventional focal piping line with hot air produced through a thin plastic duct which is concentric to the focal piping. The thin plastic duct is supported by thin, spirally wound wire coils with uniformly located, radial struts fastened to both the focal piping and the wire coils.

Summertime air conditioning and electric power are provided from both the focal piping steam and the hot air flow by way of a simple Rankine cycle heat engine loop.

10 Claims, 4 Drawing Figures

CONVERTIBLE MODULAR TRI-MODE SOLAR CONVERSION SYSTEM

BACKGROUND OF THE INVENTION

There is a real and growing need for cost/effective solar conversion systems with combined modes of operation and effective year-round solar energy utilization. Individual home-owners are generally reluctant to proceed with the installation of solar energy units and systems when faced with retrofitting problems and doubts about the year round effective operation aimed at reducing ever increasing home utility bills.

Because of the intermittant nature of solar energy availability any solar conversion system must be very effective in providing energy for useful levels of household heating, cooling and electrical power plus domestic hot water on a nearly year round basis.

Most of the solar energy conversion units and systems now being marketed are of the flat plate collector type which generate hot water which can supply a portion of the household heating needs plus domestic hot water. These systems are usually expensive for retrofitted installations in existing homes and buildings, particularly when the system is only effective during the summer months in most latitudes of the U.S. Not much attention has been directed toward the generation of electric power from these systems during the summer months because their operating temperatures are well below the practical temperature levels for effective heat engine operation.

There are certain fundamental principles in solar energy conversion hardware which are both rigid and inherent in their application to each type of house or building configuration—ie:—flat plate collectors for both flat and gabled rooftops are used for both domestic hot water and space heating. The flat plate collectors are generally rigid in design configuration, but adaptable to most any type of building rooftop providing that a southerly exposure is evident for one rooftop surface.

On the other hand, the highly effective parabolic/hyperbolic concentrating solar converters are flexible in design and multiple modes of operation, but are usually rigid in their application to buildings with flat rooftops only.

This installation adaptability situation for these types of solar conversion components leads to the application of passive and active flat plate collectors for home installations, while the more effective, higher temperature solar concentrators are natural capital equipment installations for apartment houses and flat rooftop industrial buildings and plants.

There are ways, however, of applying the more effective solar concentrators for individual homes in cases where the southerly side of the home as the back yard has a generally unobstructed exposure to the sun's excursion during the day. The high temperature linear solar concentrators can be mounted on raised structures such as carports, greenhouses or other similar secondary structures on the property. Another option is that the solar conversion system be arranged as a portable modular unit which may be placed at the most suitable location on the property. It is critical to the effective operation of these solar concentrators that they are not shadowed by adjacent trees and structures of any kind during the major portion of each solar day.

Since the linear concentrators—(parabolic and hyperbolic) solar sections are flexible in design and modes of operation there are major advantages to be gained from combining both hot water energy and hot air energy for winter time space heating, plus the generation of electrical power for summer time power/air conditioning from a single system installation for most types of building configurations.

Multi-mode solar conversion will have significant economic value for both large apartment houses, condominiums, and industrial plants plus some individual homes, since the pay-back time would be considerably shorter and far higher power generation levels would be achieved over nearly all seasons of the year. If solar energy utilization is to have any real impact on easing the oncoming energy shortfall, individual homeowners must be convinced that they are going to substantially reduce their total energy costs with the installation of a proven, integrated solar conversion system. The present D.O.E. policy of funding and constructing hugh centralized solar and wind energy conversion sites is both wasteful and cost/ineffective while serving only the power needs of specific localities through the influence of local politicians, and power utilities.

If the present D.O.E. policy of supporting hugh centralized alternate energy sites is continued then this government department will rapidly become a part of the overall energy problem rather than producing practical solutions to the many problems. Any alternate energy policy which does not stress the wide participation of the general public and individual homeowners will not solve the oncoming energy shortfall, since hugh centralized energy sites provide only a drop in the power bucket in the U.S. and serve the power utilities without any surety of reduced power rates to the general public.

Because the state-of-the-art in silicon photovoltaic cells including the latest amorphous silicon film strips continues to be discouraging from a cost standpoint, some sort of multi-mode, convertible solar concentration approach appears to be more worthwhile because one system installation can provide effective home heating service and electric power on a nearly year round basis. No matter how efficient silicon solar cells become, while costs continue to be reduced, they can never come close to matching the cost/effectiveness of both direct solar hot air and hot water heating for individual homes and commercial buildings.

Although the heat engine and electrical generator means for a multi-mode solar conversion system are relatively expensive components there is a basic cost advantage in utilizing existing winter time solar conversion concentrators for summer-time solar energy conversion.

While the silicon solar cell industry and the D.O.E. have made optimistic cost projections for improved silicon solar cells it is becoming apparent that future cost advantages will be confined to relatively large volume purchases for large array installations in the 5 to 50 kilowatt range, which will serve large commercial sites, apartment houses and condominiums. Solar cell costs will probably be excessively high in the fractional kilowatt and up to 5 kilowatt range, which would be the range for the individual homeowners. Small sub-fractional K.W. arrays of silicon solar cells will be necessary for a multi-mode solar conversion system to power the fans within the hot-air ducts of the system. There is a natural advantage to using silicon solar cells for the air moving power means within the hot air ducts, since the fans will operate only when there is sufficient solar insolation on the concentrator sections. This portion of the system arrangement will essentially be automatic in operation and the solar cell array may remain stationary and remotely located from the solar concentrator sections.

No more than three fan/motors will be required for the average home-sized solar conversion system and therefore the silicon solar cell array to power the fan motors may be limit ed to about ⅛ KW, or 125 watts, max., at about 6 to 12 volts. The fan motors within the air ducts will be located at the duct entrance, exit and mid-length of the hot air duct loop.

Several major problems exist which must be resolved before a cost/effective summer time solar conversion mode of operation can be achieved. The design of the closed Rankine cycle engine loop is critical from both the performance and cost standpoints, and carefully considered cost/effectiveness tradeoffs must be made for each component of the heat engine loop. The water-to-steam heating portion of the engine cycle offers no major problems, but the condensation phase presents several difficulties since a large effective heat transfer surface area is necessary with corresponding high fabrication and/or tooling costs.

Both the rotary steam expander (engine) and the return pump may be off-the-shelf components, so that these do not present major performance and cost problems. The cooling/condensation phase of the heat engine cycle impose major obstacles, as previously stated, and must effectively and rapidly cool the expended steam flow from the expander without excessive steam flow impedance. There are steam expansion/condensing components that can meet the necessary performance requirements, but these must receive further development effort before being a cost-acceptable heat engine component for solar energy conversion applications.

Similar problems exist for the Freon vaporization wheel drive which is based on the publicized Minto Wheel concept. There is considerable room for improvement in the basic Freon vaporization/condensation wheel drive unit which include the use of hot and cold air as the heating and cooling means instead of hot water/cold air is projected as a further advantage in increasing the wheel speed and therefore efficiency.

Since the Freon vaporization wheel unit is relatively large in size from six to eight feet in diameter it may be integrated into the tri-mode solar conversion portable module, as a removable component for servicing and/or replacement.

Because of the overall complexity of the improved Freon vaporization wheel drive it must be considered as an optional power means which is secondary to the basic Rankine cycle-heat engine sub-system. The Rankine cycle heat engine may be used for air conditioning electrical power or for any household electrical power requirement. If the Freon vaporization wheel drive is omitted as a sub-system, then the hot air duct will remain disconnected and left vented at both ends of the duct loop and connected only for winter time useage.

The primary A/C, air conditioning means for the convertible modular tri-mode solar conversion system may be the conventional and simple absorption/chiller cycle which is ideal for relatively large household A/C cooling loads. Since the closed Rankine cycle heat engine sub-system and the absorption chiller cycle must remain as separate sub-systems for maximum effectiveness, a second straight piping line must be located directly under and in tangent contact with the primary focal piping line. The focal piping will be exposed to higher solar temperatures for efficient Rankine cycle operation, while the slightly lower temperature of the lower piping will produce an adequate steam flow for the absorption chiller cycle.

Full tri-mode solar conversion is provided with or without the Freon vaporization wheel drive, but the inclusion of this sub-system would provide the highest possible solar conversion effectiveness from a single portable modular system without any operating penalty imposed on any of the other sub-systems.

SUMMARY OF THE INVENTION

The convertible, tri-mode solar concentration system is composed of integrated solar energy components which provide hot air and hot water for winter home heating with electrical power and air conditioning for summer home cooling and power. The three solar conversion modes of operation are hot air collection, hot water generation for the winter season, and steam generation for both heat engine operation and absorption chiller A/C during the summer months.

This type of multi-mode system is advocated as a cost/effective solar conversion arrangement which has the distinct advantage of providing nearly year round winter and summer solar utilization for homes and commercial buildings. The system is adaptable to all latitudes of the U.S. with favorable winter time operation in the northern latitudes due to the high concentration ratio of the parabolic sections and solar heat entrapment within the transparent hot air duct.

The addition of the hot air duct has the further advantage of increasing the solar heat residence time within the focal piping which is essential during winter time operation in the northern latitudes of the U.S. There tends to be a mutual heat transfer between the hot focal piping and the hot air within the concentric duct which works to the advantage of both modes of operation.

The convertible feature of the tri-mode solar conversion system is necessary to change over from winter time operation to summer time operation on a continuous changeover basis. During winter time operation the focal piping is directly connected to the household hot water heating system, while the hot air duct is connected to hot air registers within a chosen room or area of the home. Warm air is blown into the room through the low, floor level register and air is withdrawn from the room by a top, ceiling level register.

The hot air duct may be left disconnected and open to the air at both ends during summer operation if a Freon vaporization wheel drive is not utilized as a sub-system for a full tri-mode system. If a Freon vaporization wheel drive is integrated into the tri-mode system then the duct extension will be connected to the blown hot air output end of the sub-system duct and this hot air flow directed tangentially over the lower portion of the Freon vaporization wheel.

For summer time operation the focal piping must be disconnected by two-way valving from the household hot water heating system and directed into the closed loop of the Rankine cycle heat engine sub-system piping.

During the winter time operation of the tri-mode system, the sub-focal line piping directly under the focal piping remains disconnected and is connected by valving into the absorption chiller sub-system for summer time A/C.

The convertible tri-mode solar concentration system may be installed onto flat rooftops of apartment houses, etc, or commercial buildings and where possible onto one and two family homes. In order to provide a far wider acceptance of this tri-mode system for single family homes, all of the sub-systems may be integrated into a portable solar conversion module to be placed within an advantageous location in yard areas of all types of homes and buildings.

The portable solar conversion module may be fitted with wheels or locking casters for ease of movement and placement in the open ground areas of homes, and fastened into place at desired location. Since the parabolic concentrators will be made up of six foot long sections by four feet wide, two rows of three sections each will be required, making the portable module eighteen feet long by eight feet wide and approximately six to eight feet high.

The tri-mode solar conversion module in portable form must be made fairly high in order to prevent or minimize major over shadowing from surrounding structures, trees and various other obstacles.

The basic solar concentrating component of the tri-mode system is the linear parabolic concentrator section with a focal pipe and sub-focal pipe which receive the concentrated solar rays to produce winter time hot water and summer time steam. The parabolic concentrator sections are formed by multiple, identical parabolic shaped ribs with multiple, longitudinal stringers providing the open framework support for the polished aluminum reflective sheets. The concentrator sections are held in parallel alignment by diagonal lengths of stranded guy wires secured to the end corners of the parabolic sections.

The eighteen foot length of total concentrator length is divided into three six foot sections for ease of handling and assembly and will be supported behind the sections so that both the focal piping and transparent duct are not involved as the focal pivoting center for the full length of the concentrator sections. Since the clear plastic duct concentric to and indirectly mounted on the focal piping must have continuous, unbroken and clear air passage throughout its length, multiple thin radial spokes must be utilized to support the wire coils which retain the plastic duct sheets. Uniformly located vertical support struts connect and support the focal pipe and hot air ducts to the rooftop surface or the portable module structure.

Because the concentrator sections must pivot at the exact centerline of the focal piping, several rear circular support crescents will become a part of each six foot concentrator section sub-assembly. The crescents contain a smooth circular sector cutouts in which precision ball bearings are closely fitted to allow the concentrator sections to accurately pivot.

The two ball bearings which support each of the crescents and concentrator sections are rigidly secured to suitable base mounting brackets which are fixed to the roof surface or the top surface of the portable modules. The ball bearings must be widely spaced on the base brackets so that there is a minimum of distorted motion in the concentrator sections as they oscillate to follow the sun. The concentrator sections must oscillate freely on the bearings and supports and be capable of traveling through a total seasonal displacement angle, plus daily correction angle of about seventy-five (75 degrees).

Since the concentrator sections will be aligned on a true-east-to-west sun travel median line and be adjusted to the required seasonal solar angle for each specific latitude, the only oscillation that will occur will be for the following of the solar arc each day.

A shadowed phototransistor type of sun-following servo-mechanism may be utilized for accurate sun-tracking of the solar concentrator array.

A difficult design problem posed by the combined hor air/hot water winter time space heating modes of operation is the requirement that the focal piping and hot air ducts must not rotate with all of the concentrator sections. Both the focal piping and hot air duct must remain stationary, but the focal piping is supported at uniform distances along the length of each of the total concentrator section subassemblies.

Flexible or rotating connections at the ends of the focal piping and ducts are not desirable since these become trouble spots after the prolonged operation of such high temperature solar conversion arrangements. A workable solution to this relative motion between associated components is to provide minimal gaps between the six foot long sections so that four-(4) or more fixed supports are provided to support both the focal piping and hot air ducts over their 18 foot plus lengths. These fixed supports will be arranged so that they do not interfere with the continuity connections between the adjacent concentrator sections which will be required to oscillate each full length as a subassembly.

For the summer time operation of the tri-mode solar conversion system the steam generated within the focal piping is directed into the closed Rankine cycle loop, heat engine subsystem. In order to keep this summer time power subsystem as simple and as cost-effective as possible, both the expander and the return pump components may be rotary vaned units which may be selected as off-the-shelf items. The water-to-steam heating means to produce the required steam flow to the expander can be readily supplied by the focal piping which will reach up to about 450 degrees F. during the summer. Since the basic power and pumping components are available from commercial sources, the major remaining component, the steam condenser poses the greatest difficulty in the integrated design of this subsystem due to its required large size and inherent complex configuration. Inspite of the several basic design difficulties involved with this condensing component there are certain techniques which can be utilized to keep it both effective and cost/competitive. There is a natural advantage in placing the condenser component directly under and fastened to a local section of a concentrator section where it will remain shaded from the solar rays. Another key design feature for the condenser is to keep the continuous condensing coil in a flat form and arranged as a uniformly continuous increasing diameter expansion coil for more effective steam expansion and cooling. The basic concept and features of steam/vapor expansion are disclosed and described in U.S. Pat. No. 4,036,290, of July 19, 1977. The design of this condensing component is not limited to the utilization of an expansion condensor and any suitable, equivalent condenser component may be selected for the Rankine cycle heat engine subsystem. The effective operation of the heat engine subsystem will require that the condensing component be evolved and carefully matched to the characteristics of all the heat engine components as a subsystem.

The other summer time power generation subsystem which is the Freon vaporization wheel drive also poses some design problems and due to its large size nd complex configuration must be considered as an optional summer time subsystem. There are several features included in this latest arrangement of the wheel drive which are improvements over the first disclosed Freon wheel drive including the use of both hot and cold air as the heating and cooling means instead of only hot water as the heat source for the vaporization process.

The hot air produced by the focal zone duct is directed tangentially over the lower portion of the Freon cylinders on the wheel to cause the vaporization and transfer of the vapor to the upper cylinders. When the Freon vapor enters the cooler upper cylinders it condenses and is thereby heavier which causes the wheel to rotate due to the gravity imbalance in the full wheel.

A better choice for summer time electrical power is the previously described Rankine cycle heat engine subsystem which can be made far more compact than a comparable Freon vaporization wheel drive subsystem.

The primary air conditioning means for the tri-mode solar conversion system may be the conventional absorption/chiller A/C cycle which is an economical and basically simple home cooling means. The absorption/chiller hardware is useful because it involves a sealed cylinder containing a mixture of water and lithium bromide which provides a high rate of water absorption. Since the working pressure is low the mixture boils at about 40 degrees F., so that the water is vaporized and the lithium bromide flows to the reservoir as a liquid. The water vapor is cooled by a flowing cold water supply and then in gaseous form is brought into a heat exchanger where it extracts heat from water in an adjacent coil.

The chilled water is pumped through radiators with air blown over them to cool the rooms of the building as required. The vapor flow, now warmed, goes back to the reservoir and is adsorbed by the lithium bromide, and the cycle starts all over again. The absorption/chiller cycle may also be considered as an optional subsystem for the overall system and is best adapted to larger applications where large volume air conditioning is required, unlike most private homes. This A/C cycle subsystem would be applicable to such large installations as some apartment houses, condominiums, and smaller industrial plants.

The primary air conditioning means for household usage will be by way of electrical power for both existing room and central home air conditioning systems.

Unlike other solar conversion systems which utilize anti-freeze heat transfer solutions and costly heat transfer during winter time operation, this present system will depend on below freezing and nighttime draindown of the water within the total piping to prevent any freezing damage.

It is a principal object of the present invention to provide a versatile, and convertible, all-season solar conversion system which is cost/effective through three modes of seasonal operation. It is a further object of the invention to establish an adaptable multi-mode solar conversion system for a wide variety individual homes and multiple dwellings for all-season on operation.

Several other objectives, features and advantages of this invention will be more fully understood from the following description when taken in conjunction with the accompanying drawings with their reference numerals. It should be understood that variations may be made in the details and general features of the design concept without departing from the spirit and scope of the invention.

Several Disclosure Documents have been filed with the Office which describe the present invention and its various components.

U.S. Pat. No. 072,038—Combined Solar Conversion System

U.S. Pat. No. 071,505—Solar Concentration-Hot Air Heating System

U.S. Pat. No. 068,935—Combined Direct Photovoltaic Solar Conversion, Heat Engine System U.S. Pat. No. 071,252—Magneto/Fluid/Dynamic Solar Conversion Unit U.S. Pat. No. 072,638—Combined Mode-Freon Vaporization Wheel/Motor.

REFERRING TO THE DRAWING:

DESCRIPTION OF THE PREFERRED EMBODIMENT

Figure 1:
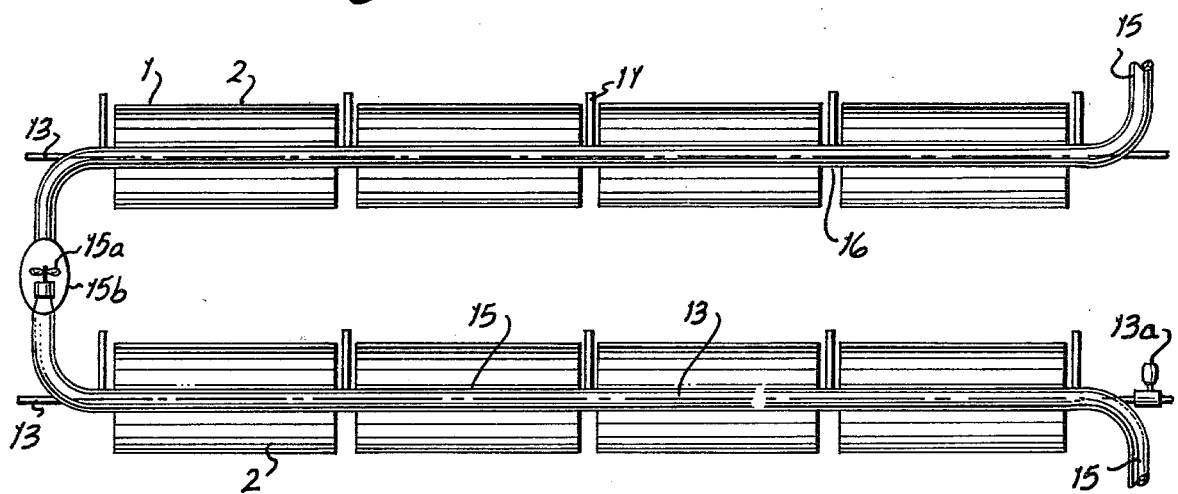
FIG. 1 is a plan view of the convertible, modular, tri-mode solar conversion system.
Figure 2:
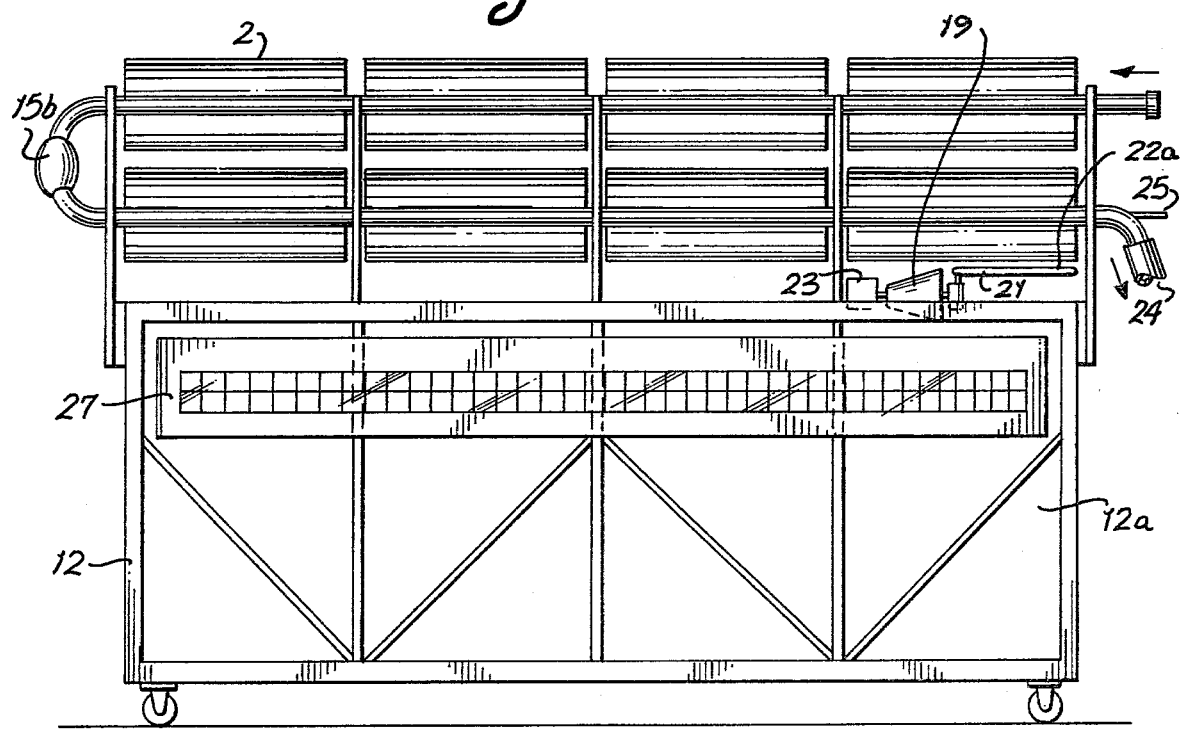
FIG. 2 is an elevation view of the convertible, modular tri-mode solar conversion system, as a portable solar module.
Figure 3:
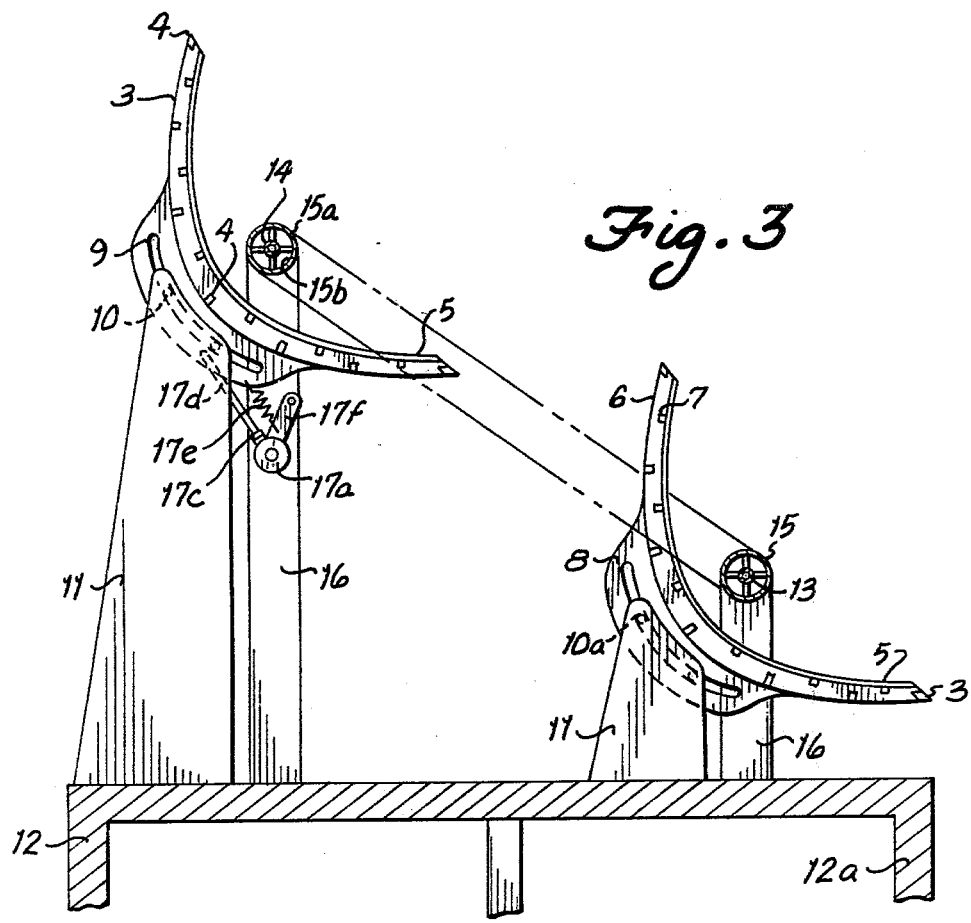
FIG. 3 is a cross-section view of the linear parabolic concentrator section with focal piping and hot air duct.
Figure 4:
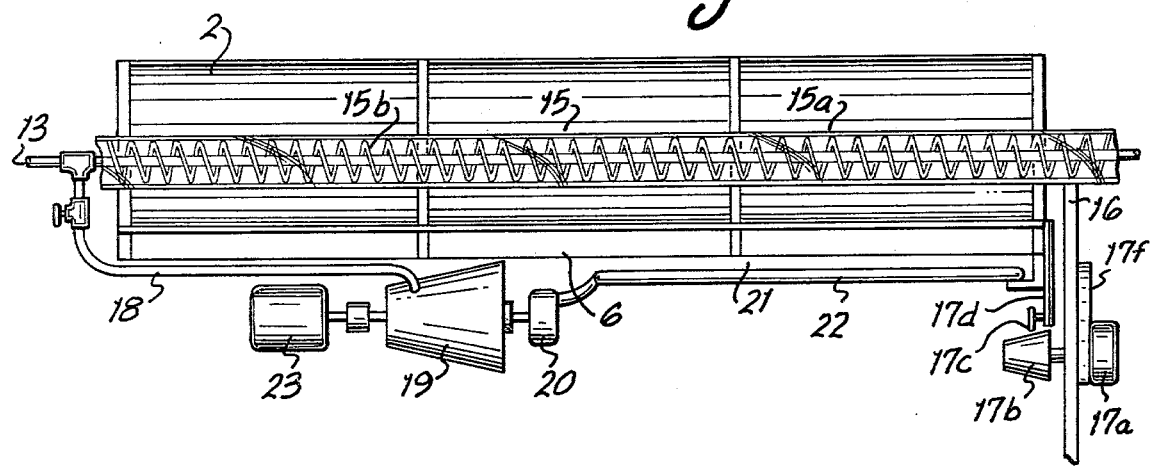
FIG. 4 is a partial elevation view of the convertible, modular tri-mode solar conversion system with the Rankine cycle heat engine subsystem, showing a single concentrator.

Referring to the drawings, numeral 1, illustrates the convertible, modular tri-mode solar conversion system which is comprised of multiple, identical linear parabolic concentrator sections 2, which are built up of multiple formers 3, and longerons 4. The multiple formers 3, and longerons 4, are joined together to form an open framework structure into which polished aluminum reflective sheets 5, are fastened. The concentrator sections 2, are held in parallel alignment by a lower epoxy/fiberglas covering 6, which provides the concentrator sections 2, with an adequate section modulus to resist wind twisting of the sections. Additional stringers 7, are located between the longerons 4, to provide intermediate support for the epoxy/fiberglas covering 6, and reflective aluminum sheets 5.

End formers 8, which are similar to the basic former 3, are located at the ends of each concentrator section 2, have a greater cross-section depth for the inclusion of the oscillation slot 9, into which fixed, twin ball bearings 10, are located. The twin ball bearings 10, are secured to support trunnions 11, located between the concentrator sections 2, by means of fixed pins 10a. The support trunnions 11, are secured to the flat roof surface or the portable solar module 12.

The stationary focal hot water/steam piping 13, is located at the axial focal line of the concentrator sections 2, and is supported by multiple radial struts 14, within the stationary hot air duct 15. The hot air duct 15, is comprised of a transparent plastic duct 15a, which is supported and held in a uniform cylindrical shape by a uniform helical thin wireform 15b.

The focal hot water. steam piping 13, and the hot air duct 15, are supported at the axial focal line by vertical supports 16, which are located between the multiple concentrator sections 2. The vertical supports 16, are secured to the roof surface or portable solar module 12, in line with the support trunnions 11.

At the end of each series of joined concentrator sections 2, the focal hot water/steam piping 13, will exit from the hot air ducts 15, where the ducts 15, turn to join adjacent concentrator sections 2, lengths, or enter the roof surface or portable solar module 12.

Motor-driven fans 15a, are located within the starting point, mid-point and ending of the hot air duct 15, to move the heated air along the concentrator sections 2. The motor-driven fans 15a, are retained within enlarged duct sections 15b, in order to clear the focal hot water/steam piping 13, and to maintain nearly the same cross-section area within the enlarged duct section 15b, as the normal hot air duct 15.

The stationary focal hot water/steam piping 13, is fitted with "T" fittings and shut off valves at the ends of the concentrator sections 2, so that the water heating arrangement may be diverted to the steam-turbine loop during the summer season. One or more motor-driven pumps 13a, are conveniently located near the ends of the full concentrator sections 2, lengths to circulate the solar-heated water within the stationary focal hot water/steam piping 13.

The sun-following or tracking means for the concentrator sections 2, may be accomplished with a conventional shadowed phototransistor sun-following sensing unit and drive arrangement for ideal East-to West sun-tacking, or by a timing motor and multi-cam unit 17, which will adjust the concentrators 2, for the sun's relative travel and atitude during each hour of the day, for N-to-S, differential, non-sensing sun-tracking. The timing motor 17a, will revolve the multiple cam stack 17b, at a basic speed of 1/24 revolution per hour, with twelve cams used for each month of the year.

More than twelve cams 17b, may be utilized for daily sun-tracking, such as twenty-four for a two week sun atitude period, or an enlarged three-dimensional cam 17b, may be employed for accurate, North-to South, differential sun-tracking. The use of this non-sensing sun-following arrangement requires that the concentrator sections 2, be manually set for the sun's monthly/seasonal attitude, by means of shifting the timing motor and multi-cam unit 17.

A ball bearing cam follower 17c, will be fixed to a follower arm 17d, which is secured to one end of the concentrator sections 2, which is coupled with a group of two or three similar concentrator sections 2. A tension spring 17e, holds the ball bearing cam follower 17c, in constant contact with the outcam surface of the multiple cam stack 17b. The timing motor and multi-cam unit 17, is supported by an adjustable mounting bracket 17f, which is secured to the fixed vertical support 16.

The adjustable mounting bracket 17f, and local portion of the vertical support 16, are calibrated for the full twelve months of seasonal solar angular attitude for a give latitude.

The convertible, modular tri-mode solar conversion system 1, is idally suited to generally flat rooftop installations, but is also adaptable to a portable solar module 12, which can be located in a home yard or garden area as portable solar conversion means. The portable solar module 12, is particularly useful for summer time solar conversion where the steam produced will drive a closed Rankine cycle loop sub-system 18.

The Rankine cycle subsystem 18, will be comprised of a simple multi-disc steam turbine 19, as a Tesla type expander component. The steam produced within the hot water/steam piping 13, will drive the steam turbine 19, and a coupled return pump 20.

The spent steam is piped to the condensing component 21, which may consist of a conventional fin and tube heat exchanger or a continuous coil of large diameter tubing 22, in flat form which is shaded under the concentrator section 2. The continuous tubing coil 22, may be made up of uniformly increasing diameter sections 22a, for effective steam expansion and more rapid condensation.

The multi-disc steam turbine 19, will be directly coupled to a 110 V.A.C. alternator 23, which is rated at approximately 2 K.W. to 3 K.W. for use with a total length of forty feet of concentrator sections 2. The multi-disc turbine 19, return pump 20, alternator 23, and condenser component 21, are all mounted under the concentrator sections 2, and secured to the roof surface, or portable solar module 12.

The portable solar module 12, consists of an open framework structure 12a, which is about twenty feet long, eight feet wide and ten feet high. These dimensions may be varied to suit each specific installation and location site conditions. The concentrator sections 2, are located in two rows at the top of the framework structure 12a, and set at two elevations to avoid excessive solar overshadowing.

While the secondary mode of electric power generation during the summer months for home air conditioning is ideal for the portable solar module 12, the other primary winter operational modes are also applicable to some degree depending on the latitude of the installation site. When winter time operation of the portable system is required, both the hot air duct 15, and focal hot water/steam piping 13, of the portable solar module 12, must be connected to corresponding household ducts 24 and piping 25. It is most desirable that both the household hot air duct 24, and household hot water piping 25, be located underground as much as possible so that this connection portion of the thermal transfer means be as unobtrusive as possible.

For large, industrial size solar system installations, a secondary focal steam piping arrangement 26, would be ideally suited for an absorption/chiller air conditioning sub-system, which would be operable during the summer months only. During the winter months, the secondary focal steam piping 26, would be left open and vented to the ambient air, or connected to a household hot water heating arrangement.

An array of multiple solar photovoltaic cells 27, will be required to power the motor-driven fans 15a, within the enlarged duct sections 15b. This array of photovoltaic cells 27, may be remotely located from the concentrator sections 2, and arranged to face in a generally southerly, sloped attitude toward the sun.

A Freon vaporization wheel drive subsystem, not illustrated, can be considered as an auxiliary power source for both winter and summer time operation of the system, where this extra electrical power may be required.

What is claimed is:

1. A convertible modular tri-mode solar conversion system comprised of multiple identical linear parabolic concentrators arranged in modular form, said multiple identical linear parabolic concentrators consisting of a built up structure of multiple formers, multiple longitudinal longerons and stringers uniformly joined at right angles to said to said multiple formers, highly reflective metallic surfaces bonded to the inner parabolic contour of said multiple formers of said identical linear parabolic concentrators, an epoxy/fiberglas covering bonded to the underside of said multiple formers and portions of said multiple longitudinal longerons and stringers, end formers for said multiple identical linear parabolic concentrators comprised of said multiple formers with the addition of greater section depth and containing circular oscillation slots, twin ball bearings fitted into each of said circular oscillation slots, said twin ball bearings secured to fixed support trunnions with corresponding fixed pins, said fixed support trunnions disposed between each of said multiple identical linear parabolic concentrators and secured to a generally flat roof top surface, stationary focal piping disposed at the axial focal line of said multiple identical linear parabolic concentrators, multiple radial struts supporting said stationary focal piping within stationary plastic transparent hot air ducts, said stationary plastic transparent hot air ducts supported in uniform cylindrical form by a uniform thin helical wire forms, vertical supports disposed between each of said multiple identical linear parabolic concentrators supporting and securing said stationary plastic transparent hot air ducts and attached stationary focal piping, said vertical supports secured to a generally flat roof top surface, exiting of said stationary focal piping from said stationary plastic transparent hot air ducts at the extreme ends of a group of said multiple identical linear parabolic concentrators, multiple motor-driven fans disposed within enlarged local sections of said stationary plastic transparent hot air ducts at uniformly spaced intervals along the total length of said multiple identical linear parabolic concentrators, tee fittings and shut off valves located on said stationary focal piping at the extreme ends of a group of said multiple identical linear parabolic concentrators, motor driven water pumps disposed adjacent to the extreme ends of a group of said multiple identical linear parabolic concentrators, multiple adjustable timing motor and multi-cam units pivotally secured to said vertical supports disposed between each of said multiple identical linear parabolic concentrators, pivoting adjustment and calibration for said multiple adjustable timing motor and multi-cam units, ball bearing cam followers fixed to multiple follower arms secured to the ends of said multiple identical parabolic concentrators, tension springs connecting said multiple follower arms to said vertical supports, a multiple disc steam turbine with piping connection means to one of said tee fitting and shut off valve, a rotary return pump directly coupled to said multiple disc steam turbine, a condensing component comprised of a large diameter continuous flat shaped tubing coil connected to the steam outlet of said multiple disc steam turbine and one end of said stationary focal piping in a closed loop subsystem, said large diameter continuous flat shaped tubing coil is disposed directly under said multiple identical linear parabolic concentrators and secured to a generally flat roof top surface, securing of said multiple disc steam turbine and rotary return pump to a generally flat roof top surface.

a 110 V.A.C. electric alternator directly coupled to said multiple disc steam turbine, an array of multiple solar photovoltaic cells disposed adjacent to said convertible modular tri-mode solar conversion system, direct electrical connection of said array of multiple solar photovoltaic cells with said multiple motor driven fans disposed within enlarged local sections of said stationary plastic hot air ducts.

2. A convertibe modular tri-mode solar conversion system according to claim 1, in which said convertible modular tri-mode solar conversion system is disposed at a right angle to a true North-South line with said multiple identical linear parabolic concentrators facing a sloped southerly direction, manual setting of said multiple identical linear parabolic concentrators on the exacy seasonal solar angle by means of the adjustment of said multiple adjustable timing motor and multi-cam units in relation to said fixed vertical supports, said shut off valves on said stationary focal piping turned to direct the flow of solar heated water into the household space heating piping during the fall and winter seasons, turning of said shut off valves on said stationary focal piping to direct the steam flow into said multiple disc steam turbine and said closed loop subsystem during the spring and summer seasons, said stationary focal piping connected to the building water supply at one end, connection of the other end of said stationary focal piping with the household hot water space heating means, said stationary plastic transparent hot air ducts connected to the sub roof air space volume at one end, connection of the other end od said stationary plastic transparent hot air duct with the building hot air ducts and registers.

3. A convertible modular tri-mode solar conversion system according to claim 1, wherein said multiple adjustable timing motor and multi-cam units consist of a three dimensional cam component, said multiple adjustable timing motors are of the synchronous low wattage A.C. type, said pivoting adjustment and calibration means for said multiple adjustable timing motor and multi-cam units disposed between said mounting bracket and said vertical supports, adjustment means for said ball bearing cam follower fixed to multiple follower arms, adjustment means for said tension springs connecting said multiple follower arms and said vertical supports.

4. A convertible modular tri-mode solar conversion system according to claim 1, in which said multiple disc steam turbine is of the variable speed conical housing type, said rotary return pump directly coupled to said multiple disc steam turbine is of the eccentric rotor and multiple vane type, said condensing component is comprised of uniformly increasing tubing diameters with the smaller diameters at the spent steam entrance and the larger diameters at the steam condensate exit end, transfer of steam condensate to the entrance side of said rotary return pump, pumping of steam condensate to the entrance/colder side of said stationary focal piping to complete the closed Rankine cycle loop.

5. A convertible modular tri-mode solar conversion system according to claim 1, wherein said convertible modular tri-mode solar conversion system is disposed on a generally flat roof top on a true North-South axis line with said multiple identical linear parabolic concentrators oscillating in a true East-to-West direction and return, shadowed phototransistor sun-following means for said multiple identical linear parabolic concentrators, fully automatic sun-following operation of said multiple identical linear parabolic concentrators through a conventional phototransistor-to-relay servo circuit, mounting of said shadowed phototransistor sun-following means at the end of a group of said multiple identical linear parabolic concentrators, seasonal manual turning of said shut off valves on said stationary focal piping to direct the flow of solar heated water into the household winter space heating piping, steam flow directed into said closed loop subsystem for summer time electric power generation, disconnection and venting of the ends of said stationary plastic transparent hot air ducts during the spring and summer seasons, reconnection and closing of the ends of said stationary plastic transparent hot air ducts during the fall and winter seasons.

6. A convertible modular tri-mode solar conversion system comprised of multiple identical linear parabolic concentrators uniformly disposed on a portable modular structure, said multiple identical linear parabolic concentrators comprised of built-up structure of multiple formers, multiple longitudinal longerons and stringers uniformly joined at right angles to said multiple formers, highly polished aluminum sheets uniformly bonded to the inner parabolic contour of said multiple formers of said multiple identical parabolic concentrators, epoxy/fiberglas coverings bonded to the underside of said multiple formers and portions of said multiple longitudinal longerons and stringers, end formers comprised of said multiple formers with the addition of greater cross-section depth and containing a circular oscillation slot, twin ball bearings fitted into each of said circular oscillation slots, said twin ball bearings secured to fixed support trunnions with corresponding fixed pins, said support trunnions disposed between each of said multiple identical linear parabolic concentrators and secured to the upper portions of said portable modular structure, stationary forcal piping disposed at the fixed axial focal line of said multiple identical linear parabolic concentrators, multiple radial struts supporting said stationary focal piping within stationary transparent hot air ducts, said stationary transparent hot air ducts supported in a uniform cylindrical form by uniform thin helical wire forms, vertical supports disposed between each of said multiple identical linear parabolic concentrators supporting and securing said stationary transparent hot air duct and attached stationary focal piping, said vertical supports secured to the upper portion of said portable modular structure, exiting of said stationary focal piping from said stationary transparent hot air duct at the extreme ends of a group of said multiple identical linear parabolic concentrators, low voltage D.C. electric motor driven fans disposed within local enlarged sections of said stationary transparent hot air duct, two shut off valves with a single tee fitting disposed at one extreme end of a group of said multiple identical linear parabolic concentrators, low voltage D.C. electric motor driven fluid pumps conveniently disposed within said stationary piping, east-to-west suntracking for said multiple identical linear parabolic concentrators by conventional shadowed phototransistor and relay/servo circuits, daily north-to-south oscillating sun-tracking by means of multiple timing motor and multi-cam units, revolving of multiple camstacks at a speed of one revolution per day with twelve cams utilized for each month of the year, multiple ball bearing cam followers secured to corresponding follower arms, said follower arms fastened to the ends of some of said mutiple identical linear parabolic concentrators, support of said multiple timing motor and multi cam units by adjustable mounting brackets secured to fixed vertical supports, adjustment and calibration means disposed between said adjustable mounting brackets and fixed vertical supports, a closed Rankine cycle loop comprised of a multi-disc steam turbine with coupled condensate return pump, a condensing component comprised of a large form diameter continuous flat tubing coil connected to said multi-disc steam turbine and said stationary focal piping in a closed loop subsystem, said large form diameter continuous flat tubing coil disposed directly under said multiple identical linear parabolic concentrators and secured to the upper portions of said portable modular structure, securing of said multi-disc steam turbine with coupled condensate pump within the lower portions of said portable modular structure, an electric alternator directly coupled to said multi-disc steam turbine, an array of multiple solar photovoltaic cells disposed on a large hinged panel along one side of said portable modular structure, direct electrical connection of said array of multiple solar photovoltaic cells with said low voltage D.C.

electric motor driven fans and said low voltage D.C. electric motor driven fluid pumps conveniently disposed within said stationary focal piping.

7. A convertible modular tri-mode solar conversion system according to claim 6, in which said portable modular structure is located within the grounds of homes so that said multiple identical linear parabolic concentrators are facing true South on the correct seasonal angle,
- manual setting of said multiple identical linear parabolic concentrators on the exact seasonal angle by means of the adjustment of said multiple timing motor and multi-cam units,
- axial adjustment means for said multiple ball bearing cam followers secured to corresponding follower arms,
- setting of said two shut off valves on said stationary focal piping to direct solar heated water flow into a household space heating piping loop during the fall and winter seasons,
- setting of said shut off valves on said stationary piping to direct steam flow into said multiple disc steam turbine and said closed loop subsystem during the spring and summer seasons.

8. A convertible modular tri-mode solar conversion system according to claim 6, wherein said stationary focal piping is connected to the household water supply at one end,
- connection of the other end of said stationary focal piping with the household hot water space heating means,
- said stationary transparent hot air duct connected to an outside air source at one end,
- connection of the other end of said stationary transparent hot air duct with the household hot air duct and register space heating means,
- solar heated hot air and hot water supplied by said portable modular structure brought into the household by insulated underground pipes and ducts,
- securing and placement safety means for said portable modular structure within the household grounds on a level ground site,
- said multiple identical linear parabolic concentrators disposed on said portable modular structure with full unobstructed solar insolation during a full daily twelve hour period.

9. A convertible modular tri-mode solar conversion system according to claim 6, wherein said multiple timing motor and multicam units partly consist of a three dimensional cam component,
- axial adjustment means for said ball bearing cam follower fixed to corresponding follower arms,
- said multiple timing motors are of the low wattage synchronous A.C. type,
- said low voltage D.C. electric motor driven fans disposed within local enlarged sections of said stationary transparent hot air ducts are located outside of said multiple identical linear parabolic concentrators,
- said low voltage D.C. electric motor driven pumps are located outside of said multiple identical linear parabolic concentrators,
- automatic operation of said low voltage D.C. electric motor or driven fans and pumps when sufficient solar insolation falls on said array of multiple solar photovoltaic cells on said portable modular structure.

10. A convertible modular tri-mode solar conversion system according to claim 6, in which said multiple disc steam turbine is of the variable speed conical housing Tesla type,
- said condensate return pump coupled to said multiple disc turbine is of the eccentric rotor and multiple flat vane type,
- said condensing component is comprised of unifromly increasing tubing diameters with the smaller diameters at the expended steam entrance and the larger diameters at the steam condensate exit end,
- transfer of steam condensate to the entrance end of said rotary return pump,
- pumping of steam condensate to the colder entrance side of said stationary focal piping to complete the closed Rankine cycle loop,
- water filling and replenishment means within said closed loop subsystem.

* * * * *